Encoding of the Visual World
in Primary Visual Cortex
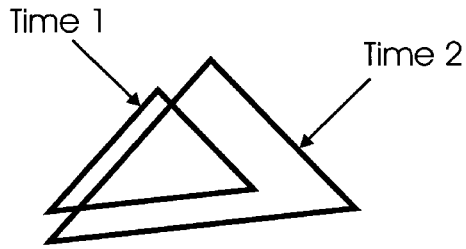
Visual Cortex Activty
at Time 1
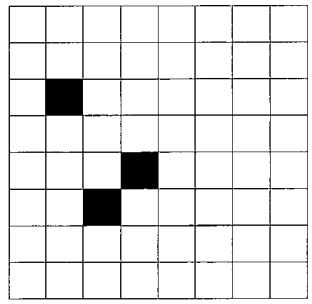
Visual Cortex Activity
at Time 2
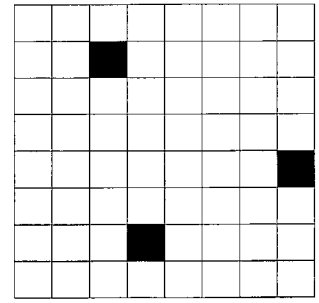
The representation in a primary cortex
shifts as the object moves

Encoding of the Visual World in Primary Visual Cortex

Visual Cortex Activty at Time 1

Visual Cortex Activity at Time 2

The representation in a primary cortex shifts as the object moves

In higher cortical areas, representations become constant, invariant, even as the object is moving.

Problem: How can we self-organize (grow) the wiring from the primary visual areas to implement invariant encoding in a higher visual area?

INVARIANT OBJECT RECOGNITION

CROSS REFERENCE TO RELATED APPLICATION

This application claims priority to U.S. Provisional Application No. 60/536,261, which was filed Jan. 14, 2004, is titled "INVARIANT OBJECT RECOGNITION," and is incorporated by reference.

TECHNICAL FIELD

This description relates to a invariant object recognition.

BACKGROUND

Object recognition is a cornerstone of the function of visual systems, whether neural or manmade. This capacity is indispensable for the function of a sensorimotor system operating in an external world, whether for navigation in complex terrain or rapid identification of the properties of food, friend, or foe. However, developing a manmade system to perform object recognition, which is so immediate and effortless for neural systems such as the mammalian brain, has proven toweringly difficult for conventional computing systems and software, despite decades of effort in computer vision and related fields of engineering. The best manmade systems for object recognition labor to deal with changes in the orientation and scale, and are defeated by the occlusion of one object with others which ubiquitously occurs in environments. Such performance is intolerable in any real-world application, whether military or commercial.

SUMMARY

In contrast to the limited performance of extant engineering algorithms and related hardware for this indispensable problem, all neural systems endowed with vision accomplish object recognition nearly immediately on the timescale of their circuitry, and accomplish the task in the face of real-world conditions where occlusion is common, and with radical changes in scale as for example occur when a predator approaches its prey. The difficulty encountered in attempting to solve this problem with conventional engineering, mathematical and computer science methods hints that conventional algorithms and computing architectures are not suited to this problem. In contrast, the performance of neural architecture in accomplishing real-world object recognition speaks for itself.

What then is the neural architecture which is responsible for the power of object recognition in the brains of animals? We know its performance must be such that object identification can readily occur despite changes in the scale of the image, its lighting, occlusion, rotation, position in the visual field, and other such transformations of the image which occur in the ordinary course in the natural world.

Natural visual systems take in raw sensory data, which typically shifts as an object moves across the visual sensory array (the retina), and transform it into an invariant representation associated with the identity of the object, enabling a fast decision to be made about appropriate reaction. Thus, fast neural visual object recognition requires the sequence of patterns representing an object on the retina to be transformed into a stable pattern uniquely encoding the object itself. The desired system therefore is a self-organizing content-addressable memory: the retinal image or low level preprocessor encoding triggers the activation of a high level object representation. Iterative computation is not required.

We know that the mammalian cortex includes primary areas which receive direct thalamic input, where the pattern on the visual sensor surface of an apple is entirely different depending upon whether it is close to or far from a monkey. Nevertheless the pattern of activity triggered in the higher association areas, particularly in the inferotemporal cortex, is quite invariant to the scale of the object (Tanaka et al 1991). Further, this higher visual area has been shown by selective lesion studies (Mishkin 1981) to be vital for successful object recognition in primates, suggesting that the invariant encoding in IT cortex is required for the behavioral performance display of object recognition function.

Conversely, though an apple and a rock of similar size and shape trigger highly overlapping initial images on visual sensors (the retina), these two objects nevertheless trigger different patterns in the higher cortical areas which have been shown indispensable for object recognition. We conclude that powerful neural sensory systems for object recognition must be capable of solving the following paradox: the overlapping representation of different objects of similar size, location and shape must trigger activation of different representations in higher areas, while the entirely non-overlapping and dissimilar early sensory patterns triggered by the same object in different positions in the external world must trigger an invariant pattern in some deeper area of the neural system, encoding the presence in the environment of the given object regardless of its position, orientation or closeness of approach. We seek here to identify the neural mechanism for invariant object recognition in mammals, and to quantify its computational performance advantage (in the sense of timesteps required to produce the invariant representation given the initial sensory surface activation) over conventional computing hardware and algorithms. Some grasp of the extraordinary power of the neural systems for object recognition may be gained by recognizing that in mammalian systems, which use neural components operating at frequencies less than 250 Hz, 150 milliseconds is adequate for object recognition to occur in complex real-world environments. We seek therefore to identify the computing architecture used by the mammalian visual system and to implement it, first in simulations and software algorithms, thereafter in hardware components.

The details of one or more embodiments are set forth in the accompanying drawings and the description below. Other features and advantages will be apparent from the description and from the claims.

DETAILED DESCRIPTION

Figure 1:
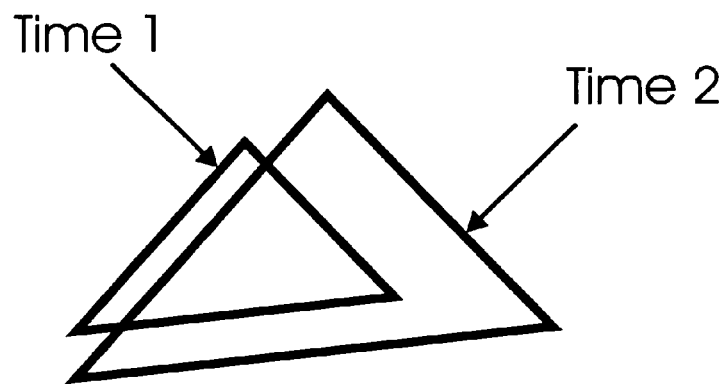
FIGS. 1-5 are block diagrams illustrating visual representation of objects invariant to transformation.
Figure 1:
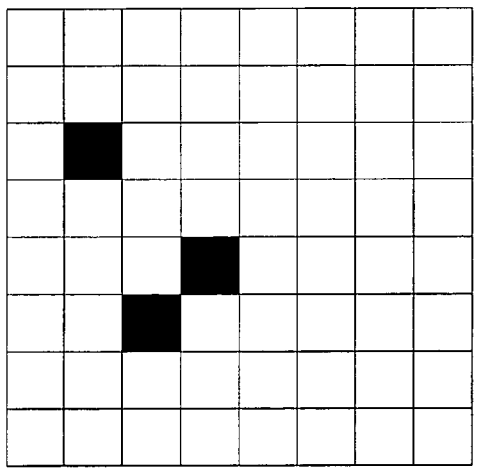
Figure 1:
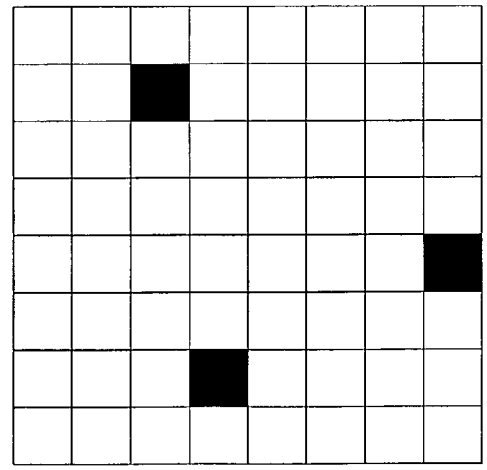

What military and commercial value might reside in circuitry which could accomplish the identification of a moving visual object within a small number of timesteps? The range of the applications are enormous. A missile tracking system needs to discriminate a target from all manner of noise and distractors. A robotic vehicle exploring a hostile or distant environment needs to navigate in close quarters in a terrain filled with objects, identifying and characterizing the properties of both targets and obstacles. Autonomous commercial vehicle navigation system can require the ability to distinguish the identity of moving objects. An artificial visual system aiding the blind requires the ability to identify nearby objects. The classic legacy commercial applications range from face recognition to character recognition for handwritten characters, in all languages. More distantly, any intelligent robot with visual sensory function can presumably navigate an environment populated with objects which must be identified for the robot to function adequately. Object recognition has been a central goal of computer vision research for decades, because it is a cornerstone of visual function, with application to all intelligent devices which employ visual sensors.

In one aspect, a demonstration simulation of the architecture proposed can be engineered to solve the invariant object identification problem, working on large set of simple objects moving through a virtual visual environment. A basic approach can be modeled after Rhodes 1992, which is incorporated by reference in its entirety. As further detailed below, the architecture proposed is based upon the circuit elements, wiring architecture, and connection (synaptic) properties of the mammalian cortical hierarchy, a neural structure which accomplishes object recognition in real-world environments rapidly, and which encodes representations of visual objects which are invariant with respect to changes in object size, orientation, and position in the visual field. The system functions as a self-organizing content-addressable memory, in that simply feeding in the visual images causes a cascade of feedforward inputs which result in increasingly invariant representations of the object presented to the system with each succeeding "cortical" area. The information is stored in the wiring connectivity itself, which is built up as the system is exposed to the objects moving through the visual field, as during normal experience.

In another aspect, the computation power of the proposed neural architecture to perform object recognition can be quantified and compared to conventional methods. When the algorithm is working in software on simulated 2-d images, the computation floating point load required to solve the problem using the proposed neural architecture can be directly calculated. The floating point operations required for conventional algorithms developed for invariant object recognition can be estimated and compared. Finally, the speed of the neural architecture when implemented in VLSI can be estimated, to assess the utility of this architecture for real-world problems.

Other important features can include the architecture of a hierarchy of cortical areas, the properties of the synaptic connections, particularly the temporal integration across images afforded by the NMDA receptor properties embodied in cortical excitatory synapses, local interneurons, integration of the feedforward synaptic input in the electrically active branches of dendritic trees, development of a virtual environment and a class of visual objects which can move within that environment, allowing for dilation (as when an object is approached) rotation, and translation, testing of the system performance, and quantification of the number of timesteps required for completion.

Most conventional computer vision algorithms for invariant object recognition use a highly computationally intensive three-part strategy: first, the presence of an object is identified, with some form of figure-ground segregation methods; second, the object is transformed into a centered and normalized reference frame (object-centered coordinates) so that it may be compared with stored exemplars; the centered and normalized object is then matched to a template, or a set of related templates (e.g. Würtz 1997), or compared with object templates using basis-function or principal component methods. In these systems, not only is there computational load in the figure-ground and normalization procedures, but then all the stored objects must be iteratively compared with the normalized object of interest. The computational load of this strategy has made it very much unsuited for real-time applications. It bears no relation to biologically plausible computational operations. Because of the evident power of biological visual systems in performing object recognition, one seeks more neural architectures.

A variety of neural network architectures can be suitable for the systems. Starting with the Neocognitron of Fukushima (1980), there has been a 20 year long tradition of neural network architectures devised to address invariant object encoding, many using some hierarchy of processing layers. In Fukushima's work, feature filter layers are followed by pooling layers, where translational invariance of feature sensitivity across some translation distance is accomplished by wiring a set of position-dependent feature filters of the same orientation but at differing locations across space to the same unit in layer 2, with this process iterated. More sophisticated versions of this class of system have been developed (Wersing and Körner 2003), in which the connectivity matrixes are determined by gradient descent in the inner product between feature detectors and image patches, with some form of competition enforced at each layer. Thus the weights do not self-organize in this class of algorithms. The solutions in the literature offer many attractive means to construct first order feature detectors which decompose natural images (an elegant example is in Olshausen and Field 1997), generally resulting in collections of edge-sensitive detectors, but the subsequent step of constructing higher order features (i.e. features which represent sets of primitive features) is less elegantly solved, for example with explicit principal component analysis (for a recent example Wersing and Körner 2003) to determine the most useful intermediate order feature for classifying a given training set. This is an offline, nonneural, and computationally expensive method.

In one well-known solution to optical character recognition (Lecun et al. 1998), which has features of a highly constrained invariant object encoding problem, the best early-stage as well as intermediate-stage features are determined by error backpropagation, where the choice of which combinations of feature primitive are combined to make intermediate stages (higher order) features is explicitly determined by supervised gradient descent to minimize classification errors on a training set. However, backpropagation is implemented with a highly non-neural architecture, which is known to scale very poorly in high dimension problems (i.e., in environments with complex images and contexts), and so while tractable for character recognition is not suitable for real-world problems. What is needed, are self-organizing algorithms, where the weights between neurons develop themselves during experience based upon local synapse-modification rules, and one which is not defeated by the complexity scale-up inherent in real-world problems. The intermediate layers, which encode higher order features, should themselves self-organize, with local rules, which can be iterated in a hierarchy of layers. And the encoding should be distributed, so that a pattern of activation across a 2-dimensional cortical sheet encodes the presence of an object, for the benefits of distributed representations (fault-tolerant, graceful degradation, generalization to unfamiliar objects). Again, biological neural systems (as differentiated from neural network systems) inherently self-organize, and do scale up to handle real-world complexity; we are led to advocate emulation of the neural circuitry and local cellular and synaptic which has evolved in biological systems to solve these problems.

Dynamic link architecture can be a more neural approach to invariant object recognition, which relies on a hypothesized property of connections between neurons.

In biological neural object recognition, there is no supervised learning, all computations are local in space and in time. Further, and critically, biological creatures do not (and for survival cannot) process and reprocess over many computation cycles in order to settle on the identification of an object in their environment. A predator must be identified immediately and appropriate action taken to ensure survival. In the mammalian brain, visual sensory information flows from retina forward to the thalamus, and thence to a series of visual cortical areas in the following sequence: V1→V2→V4→IT. The pattern of activity in the first visual cortical area is transformed in the second, and retransformed, and by the inferotemporal cortical area (IT) (the $6^{th}$ station of the sequence of areas starting with retina) an invariant object representation is produced. Importantly, in addition to the feedforward flow, there is contant feedback from each higher area back to the preceding area, and the feedback is constant and integral to the circuitry. In mammals, from the time an object appears in the visual field to the time it triggers an invariant representation is about 150 msec (Ungerleider et al. 1994), with much of this time consumed in propagation delay along axons, and integration time for input to trigger output at each neuron in the cascade.

In the neural process achieved in biological system just described, the appearance of an object in the visual field triggers the activation of the representation of that object in each area, with the representation increasingly invariant (to scale, rotation, translation and other transformations) with each succeeding step up the hierarchy. In this sense, it can be described as a content-addressable memory. The image of an object, in any position and size, as it passes through a cascade of cortical areas, triggers activation of a distributed pattern of activity which encodes the presence of the object.

Advantageously, biological neural architecture can be implemented in invariant object recognition hardware. The object recognition architecture of the mammalian cortex can be implemented to use neuronal elements with the local nonlinear integrative properties of cortical neurons. The end goal is a module of synthetic neural circuitry rendered in VLSI which can take in visual (or other sensory) raw data after processing through a topographically organized feature detector, and after a period of unsupervised learning by presentation of common objects moving through the environment, can adjust its connection strengths so that, upon later presentation of a familiar object, a distributed pattern invariantly encoding that object shall be activated in a high-order area.

In this system, the primary flow of information is feedforward, as from retina to thalamus to V1 and onward into the cortical hierarchy of areas. Though in the mammalian system there is continuous feedback at each stage, a ubiquitous aspect of cortical circuitry, the object categorization is made within 150 msec, about 85 msec after activity reaches the thalamus, leaving only 20-25 msec for each stage from V1 to V2 to V4 to IT. Given that the feedforward integration and transmission time from area to area is about 15 msec, this system largely functions in a single feedforward pass; thus the object triggers the output result, as a content addressable memory. There is no separate figure-ground operation to identify an object, and no geometric transformation in order to reach a normalized and centered coordinate system, the Achilles heel of conventional methods. The feedforward connections in a cascade of several identical processing areas, as with the hierarchy present in mammalian sensory cortices (Pandya and Yeterian 1985) are self-organized during the course of early experience. The wiring is established not by some supervised method, but rather by exposure to the environment itself.

There are two critical elements to the neural circuitry, which are not features of existing models, which confer great power to the system. They both concern the biophysicals of signal transmission and integration in cortical pyramidal neurons.

Synaptic connections are strengthened using a temporal eligibility trace, so that a synapse which was active a short while ago remains ready to strengthen upon firing of the dendritic branch receiving synaptic input. In this way, separate features active during temporally adjacent views of an object become wired to the same cell (indeed to the same dendritic branch) in the higher area to which they project. As first suggested by Foldiak (1991), such a temporal trace in a feedforward area-to-area architecture enables invariant object representations to form, by linking together succeeding views of an object as they occur during experience. For example, the NMDA receptor which in part mediates biological synaptic transmission has the requisite properties to implement a temporal trace.

In prior work on neural network object recognition, neuronal elements sum input in a simple manner, with linear summation of inputs passed through a thresholding function, a classic neural network unit, such as, for example, nonlinear integration of inputs in the dendritic tree of pyramidal cells. See, for example, Rhodes 1999. It has been predicted that neuronal input to a branch can fire that branch when the input exceeds a threshold, so that each branch acts as a quasi-isolated nonlinear element. This predicted phenomenon has recently been experimentally confirmed. See, for example, Schiller et al. 2003. The reconception of neurons as branched structures with nonlinear active processes in each branch greatly enhances the power of neurons as computational units, a feature which heretofore has not been incorporated into neural network research (but see Mel and Fiser 2000) and which can add great power to a new class of neural architectures. This complex power of individual neuronal units can be integral to the ability of the proposed system to separate the identity of similar-appearing but distinct objects (i.e., of linearly inseparable objects) and thus is vital for real-world applications.

FIG. 1 illustrates encoding of the visual world in the primary area. In particular, FIG. 1 shows a simplified representation of a processing area (analogous to an area of the cerebral cortex) which encodes the form of a shape (in this case, a triangle). The complex shape is reduced to a set of edges, each of which is in a different location and has its own orientation. At "Time 1," the so called V1 (visual area 1) encoding takes the retinal image of a triangle, and recodes it into this compressed representation. As shown, a moment later, at "Time 2", the triangle gets bigger (i.e., as an observing agent approaches the object) and the units encoding the triangle in V1 now change. There is no overlap between the V1 encoding of the triangle at time 1 with that at time 2, even though it is the same object.

Figure 2:
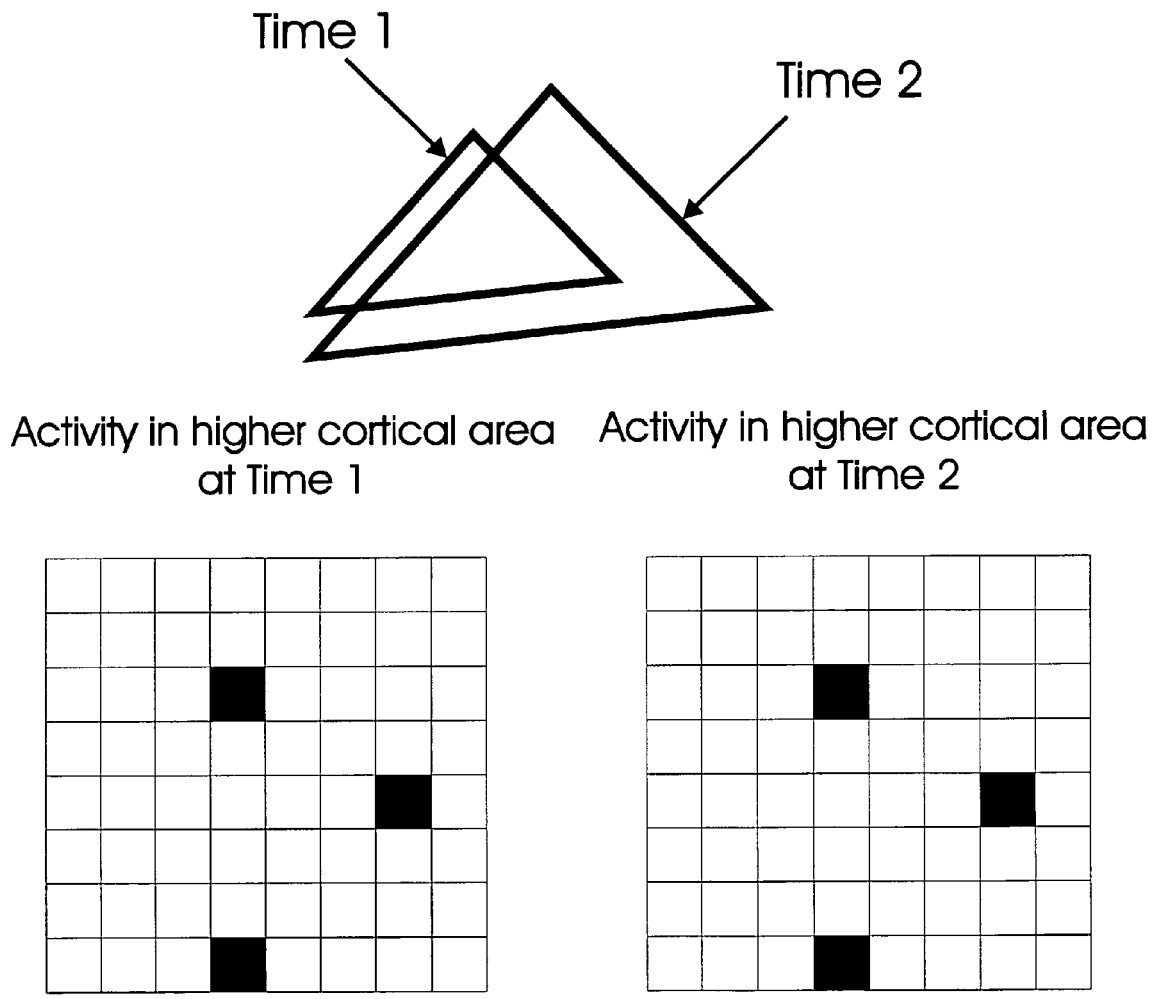

FIG. 2 illustrates encoding of visual world in a higher visual area. In the brains of mammals, the representation of an object in higher processing areas becomes less dependent upon its position and scale, and more associated with the identity of the object itself. Thus, in the higher visual encoding area, the encoding stays invariant as an object approaches. This results in a useable representation of the identity and presence of an object.

Figure 3:
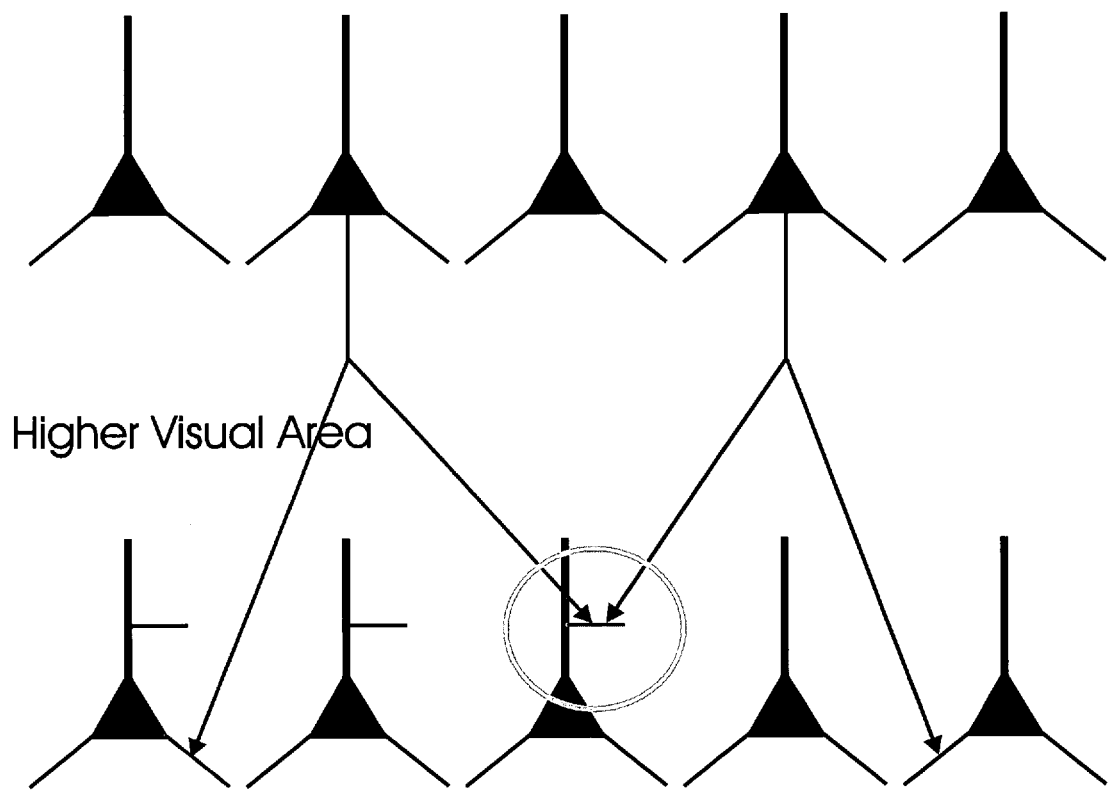

The question posed by FIGS. 1 and 2 is how does the wiring to support such an invariant representation arise given that its inputs (here the signals coming from the V1 array) shift from moment to moment? FIG. 3 serves to illustrate the proposed solution to this problem. The illustration is further simplified to a single row of cells from the visual primary area and a second row of cells from the visual higher area where the invariant encoding will be. Here, at Time 1, a single cell in the primary sensory area is active (representing a single edge of the triangle in FIG. 1 above). The output wires (axons) of this cell provide input at a variety of branches (they are called "dendrites" in the context of biological neurons) of the cells of the higher sensory bank. We will focus on their input to the branch highlighted with the gray circle.

Figure 4:
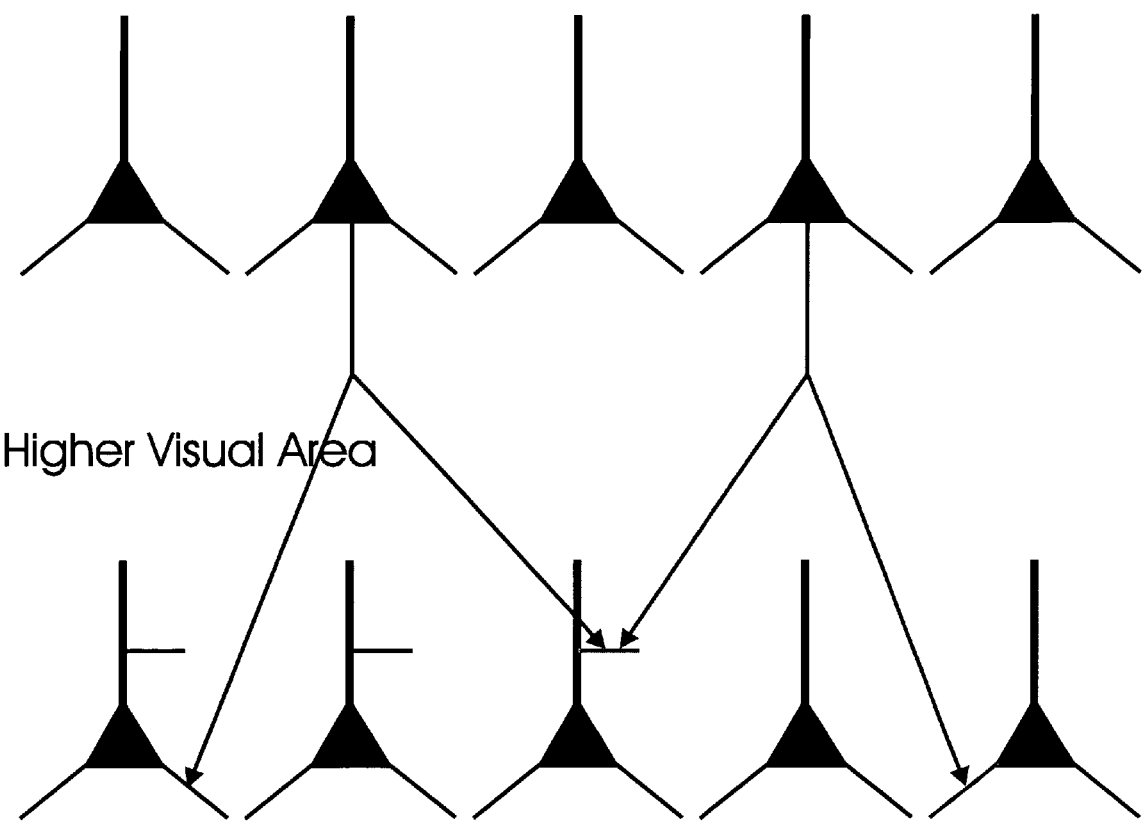

In FIG. 4, at time 2, the object has shifted, and hence the cell active in the primary visual sensory area has shifted. Its output wires transmit to a variety of branches in the higher area, and there is one such branch in common with the recipients of the output of the cell active at time 1. This second input to the common recipient branch fires the branch, strengthening that input by a Hebbian algorithm, simply when input and target both fire. The properties of the signal transmission in the proposed system allow the input which was active at time 1, a short time before, to also remain ready to strengthen triggered by the firing of the branch.

Figure 5:
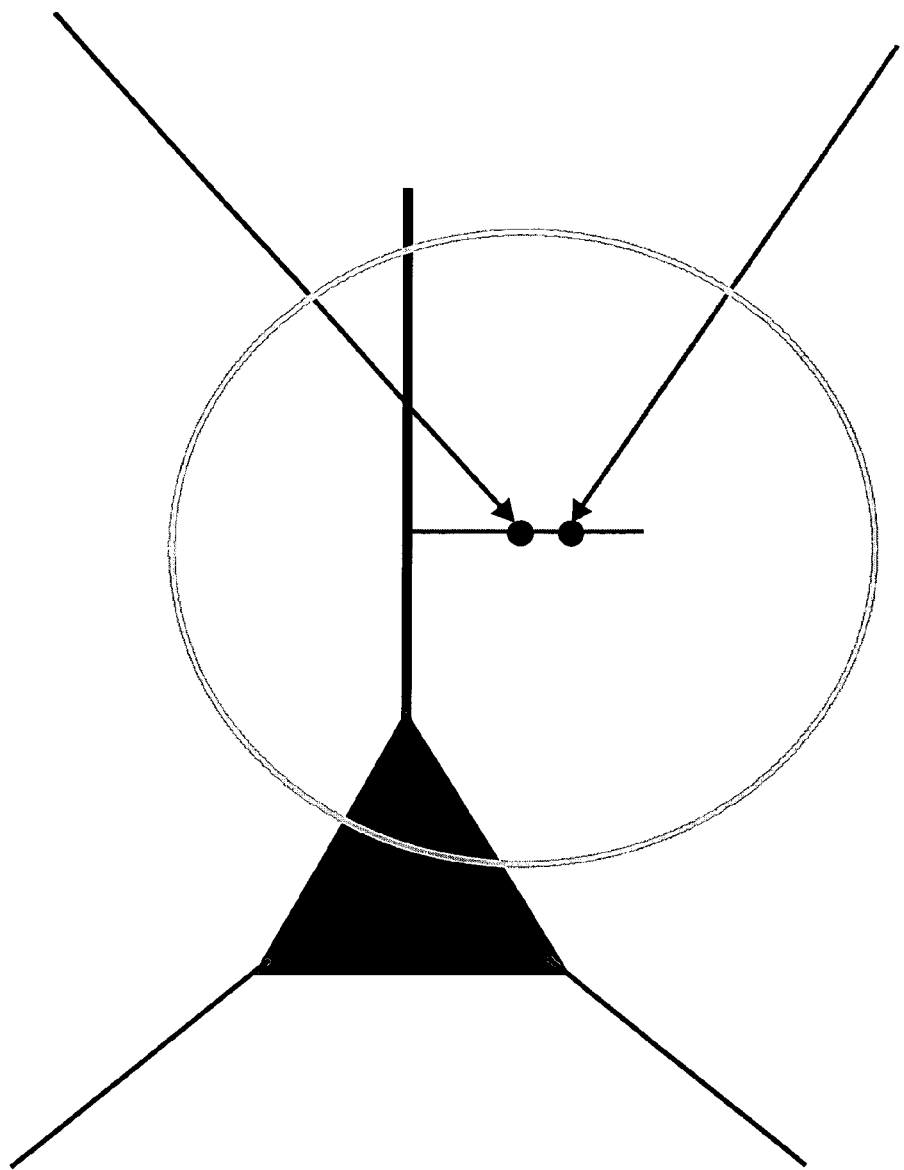

FIG. 5 illustrates a blowup of the branch of the cell in the higher area which receives input from the two cells active at times 1 and 2 in the primary area. The black circles indicate newly strengthened synapses. Now, when either cell in the primary area which had been active fires, they will both trigger the same cell to fire in the higher area. In this way, a shifting sequence of patterns of input become associated with a constant pattern of activity, the sought-after invariant encoding of the object, in the higher visual area.

Other features can include formation of a simulated system, demonstrating the performance of this architecture and quantification of the time required to recognize an object. In one implementation of a simulation system, there are four areas, each a cortical sheet of 16×16 columns of neurons. Each column contacts a pyramidal neuron and an interneuron. Thus, the simulation entails 2048 individual cells. As in the mammalian cortex, forward connections from area to area are roughly topographic, while feedback projections from higher to lower areas have more widely distributed axonal projections.

The simulation system incorporates the principal neuronal elements. The individual neuronal units are not logistic functions or even single compartment integrate and fire units. Rather, each simulated neuron incorporates a dendritic tree modeled with compartment model accuracy. In addition, the dendritic membrane is endowed with active electric currents, as is the case in biological pyramidal cells. These complexities of pyramidal neurons are central to their integrative, and provide a clear advance over prior work; neuronal elements of this realism are not used in any extant object recognition system of which the author is aware. The power of an electrically active dendritic tree is in allowing local nonlinear integration of input signal patterns in quasi-independent branches. This is a predicted property of real neurons, which has been recently confirmed experimentally. It appears that local nonlinear integration of the feedforward synaptic input in the electrically active branches of dendritic trees is pivotal to enable the selectivity required for the ability to simultaneously store and discriminate a large number of partially overlapping linearly inseparable objects.

The simulation system incorporates local interneurons. A very common element in most pattern recognition models of any type is the inclusion of local lateral inhibition to sharpen representations at each succeeding cortical level. Neurons may be modeled as multicompartment neurons with active dendrites, and connections to their dendritic compartments may be incorporated. They in turn contact the dendrites and cell body of pyramidal cells within a radius. These units are encoded in the simulation, and the parameters of their connectivity strength, radius and density is subject to variation to tune the performance of the simulated system.

The properties of the synaptic connections between cortical cells are complex, stochastic, labile and dynamic. Thus, it is known that individual connections between cells of different times have different temporal properties, some weakening and others strengthening with repeated input of a given frequency. It is through these properties that real biological synapses may be related to their function within circuits, and the simulation incorporates realistic properties into the synaptic connections between the two cell types. In addition, it has been noted that the temporal integration across images which is the heart of the mechanism by which the connections which implement invariant object recognition self organizes afforded is the long open time of the NMDA receptor. This receptor, which along with the AMPA mediates much of the excitatory transmission in the cortex, has these remarkable properties: 1) it remains open for a rather long while (some 75 msec) on the timescale of the circuitry (integration in 5-15 msec for a single neuron input/output); 2) it is gated by voltage excitation occurring at any time after its activation within the 75 msec window; and 3) when current flows through the NMDA receptor, synapse change is induced. The time window allows features encoding successive view of objects in a lower area to be jointly wired to the same cell in a higher area. This property of cortical synapses will be incorporated into the synapse in the simulation.

The simulation includes development of a virtual environment and a class of visual objects which can move within that environment, allowing for dilation (as when an object is approached), rotation, and translation. A virtual visual environment allows a large set of simulated objects to drift across the visual field. As with images of objects in the external world as they (or the viewer) move, these simulated images will drift, dilate, and rotate as they pass through the simulated visual field. A test set of objects will be developed, and an automatic encoding of edge detectors will be embedded in the first cortical area.

With the simulation constructed in all its elements, and the virtual visual world programmed, the system may be initialized with small random connection weights and then exposed to a library of visual objects. As each moves through the visual field in the manner described above, synapses will change strength through a process gated by current through the NMDA receptor. The objects will be presented and represented in many different starting and ending positions, so that the system will be exposed to objects in many different random trajectories. During this visual experience phase, any synapse modifications will be ongoing, and it is in this sense and during this time the wiring of the neural circuitry will self organize. A measure of system performance will be developed to guide parameter changes. Optimal performance will be achieved when each of the set of objects to which the system is exposed triggers in the higher cortical area a unique distributed pattern which, while different for each object, is unchanging for a given object as it moves through the visual field, rotates, and dilates in scale.

A number of implementations have been described. Nevertheless, it will be understood that various modifications may be made without departing from the spirit and scope of the claims. For example, while the techniques have been discussed in terms of visual object recognition, the techniques may be applied in other settings where a temporal sequence of patterns all represent the same object in an abstract sense. Stated another way, the techniques may be used to recode a sequence of patterns into a constant item.

What is claimed is:

1. A computer-implemented method of object recognition, the method comprising:

defining simulated neural circuitry comprising a hierarchy of areas made up of neuronal elements, with each neuronal element comprising a tree of one or more branches, with each of the one or more branches being connected to receive inputs from multiple other neuronal elements, and establishing connectivity of the simulated neural circuitry using sequences of images that shift from moment to moment and represent objects moving through a visual field such that, after the connectivity is established, an image of each object, positioned at any location in that visual field, activates an invariant pattern of activity representing that object in outputs of a highest area of the simulated neural circuitry that corresponds to recognition of a presented object, wherein establishing connectivity comprises, when images of the object presented within a certain window in time trigger inputs to a branch and activate the branch, connections between those temporally correlated inputs and the branch are strengthened, such that in each successively higher area of the hierarchy the image triggers an increasingly invariant pattern of activity.

2. The method of claim 1, further comprising the use of the simulated neural circuitry for the recognition of presented objects by:

presenting an image of an object to the simulated neural circuitry such that a pattern of activity which corresponds to the identity of the presented object is activated in outputs of the highest area of the simulated neural circuitry; and using that pattern of activity in the highest area to recognize the identity of the presented object.

3. The method of claim 1, wherein establishing the connectivity of the simulated neural circuitry comprises:

initializing connections between elements of the neural circuitry; and establishing an initial encoding of a visual image in a pattern of activity of outputs of neuronal elements of a lowest area of the simulated neural circuitry.

4. The method of claim 1, wherein the images represent movement of the objects between different starting and ending positions.

5. The method of claim 1, wherein the images represent rotation of the objects.

6. The method of claim 1, wherein the images represent dilation of the objects.

7. The method of claim 1, wherein the simulated neural circuitry includes simulated neuronal elements with a tree structure for receipt of input, with each branch entailing local nonlinear integrative properties.

8. The method of claim 1, wherein the simulated neural circuitry functions as a self-organizing content addressable memory.

9. The method of claim 1, wherein neuronal elements of the simulated neural circuitry are represented as including multiple branches and are configured such that a neuronal element is activated when a particular branch receives a combination of inputs associated with that branch.

10. The method of claim 9, wherein the simulated neural circuitry includes multiple areas, each of which includes multiple neuronal elements.

11. The method of claim 10, wherein each of the areas includes a collection of columns of neuronal elements.

12. The method of claim 11, wherein the areas are arranged in a series from a lowest area to a highest area and feedforward is provided from outputs of the neuronal elements of one area to inputs of neuronal elements of a higher area.

13. The method of claim 12, wherein the simulated neuronal circuitry further comprises feedback from an area to a lower area.

* * * * *